May 28, 1968   R. L. WELLMAN, JR   3,385,459
CARGO TRANSPORTING APPARATUS
Filed March 2, 1966   4 Sheets-Sheet 1
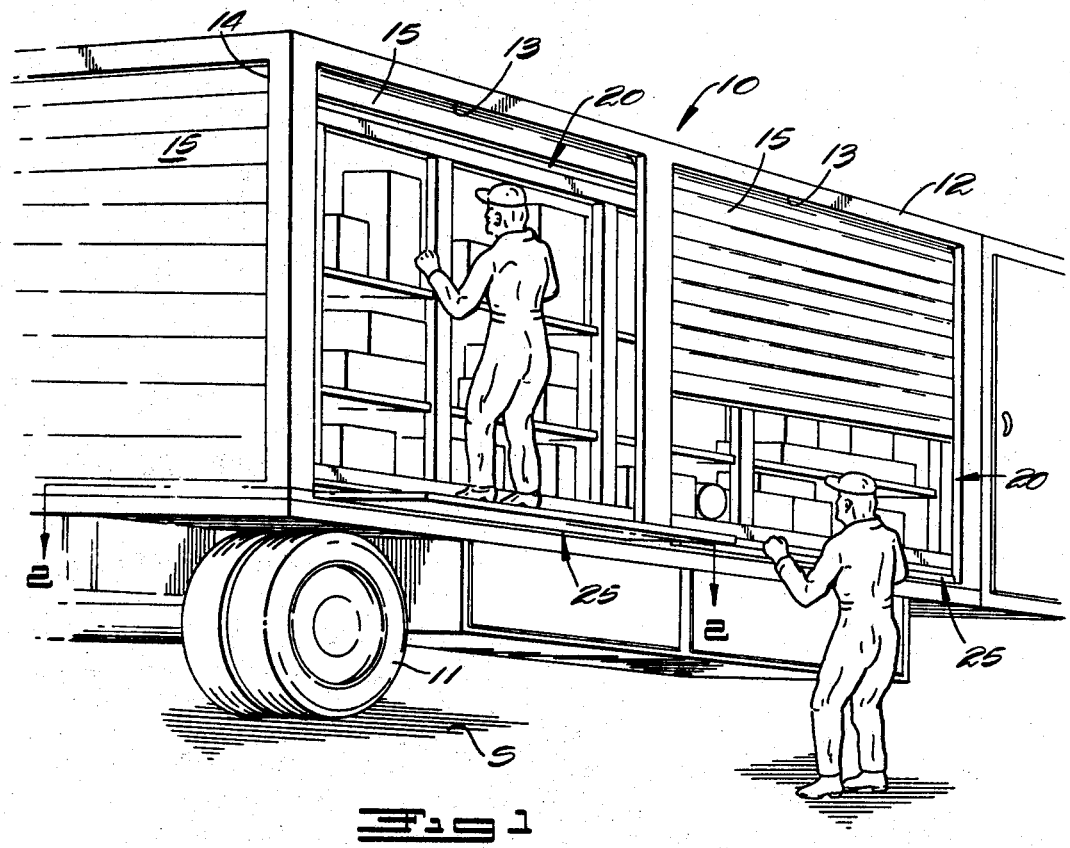
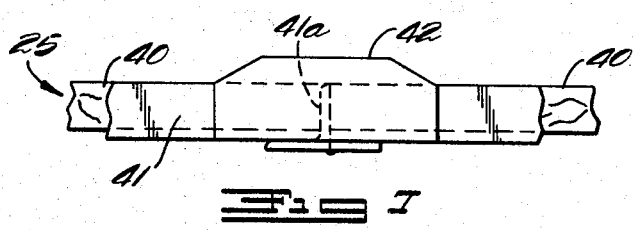
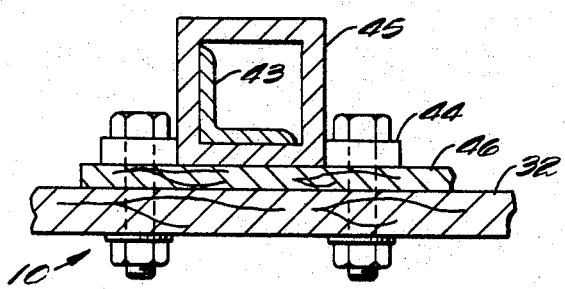
INVENTOR.
ROY L. WELLMAN, JR.
BY
MAHONEY, MILLER & RAMBO
BY
ATTORNEYS

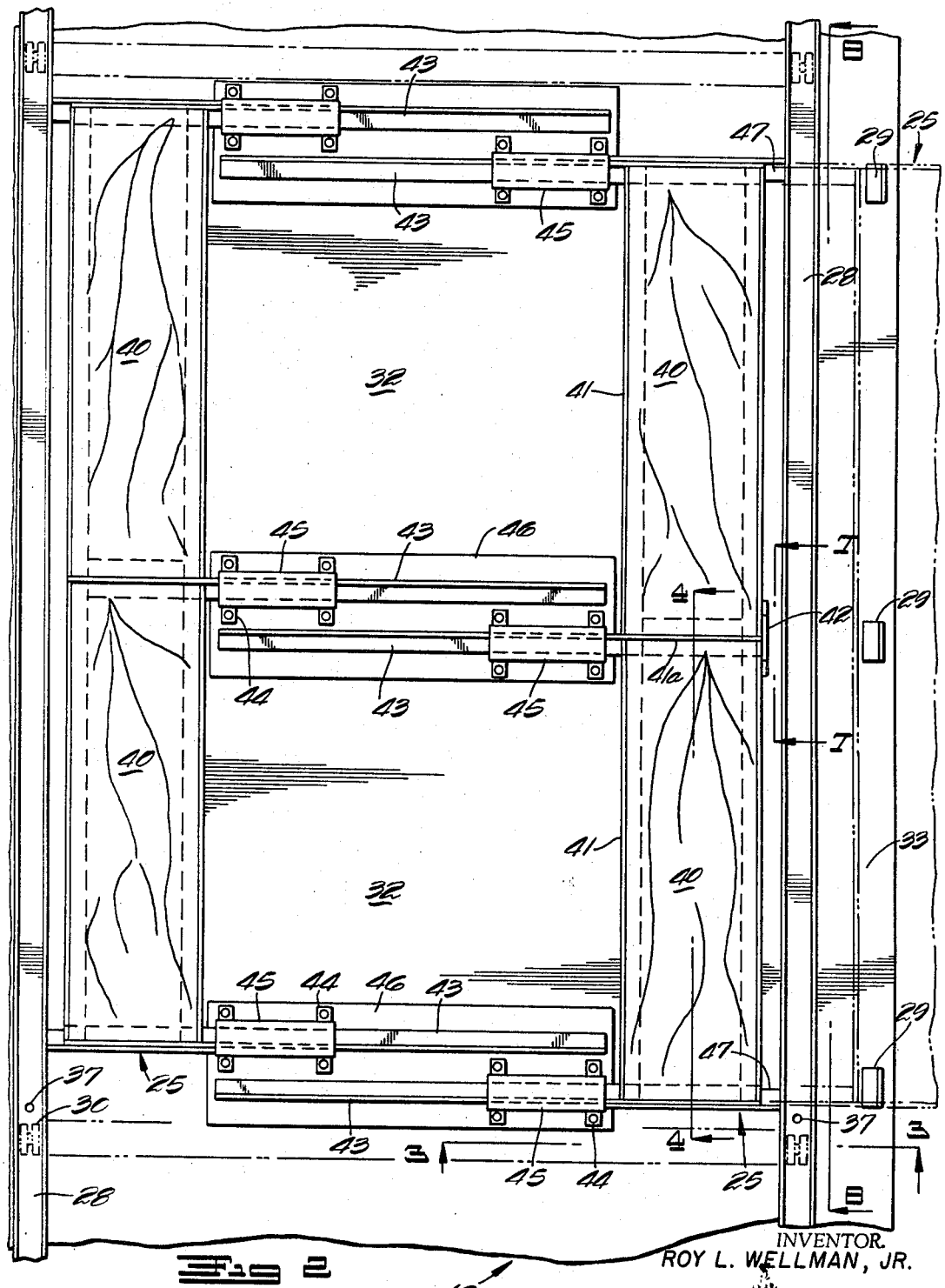

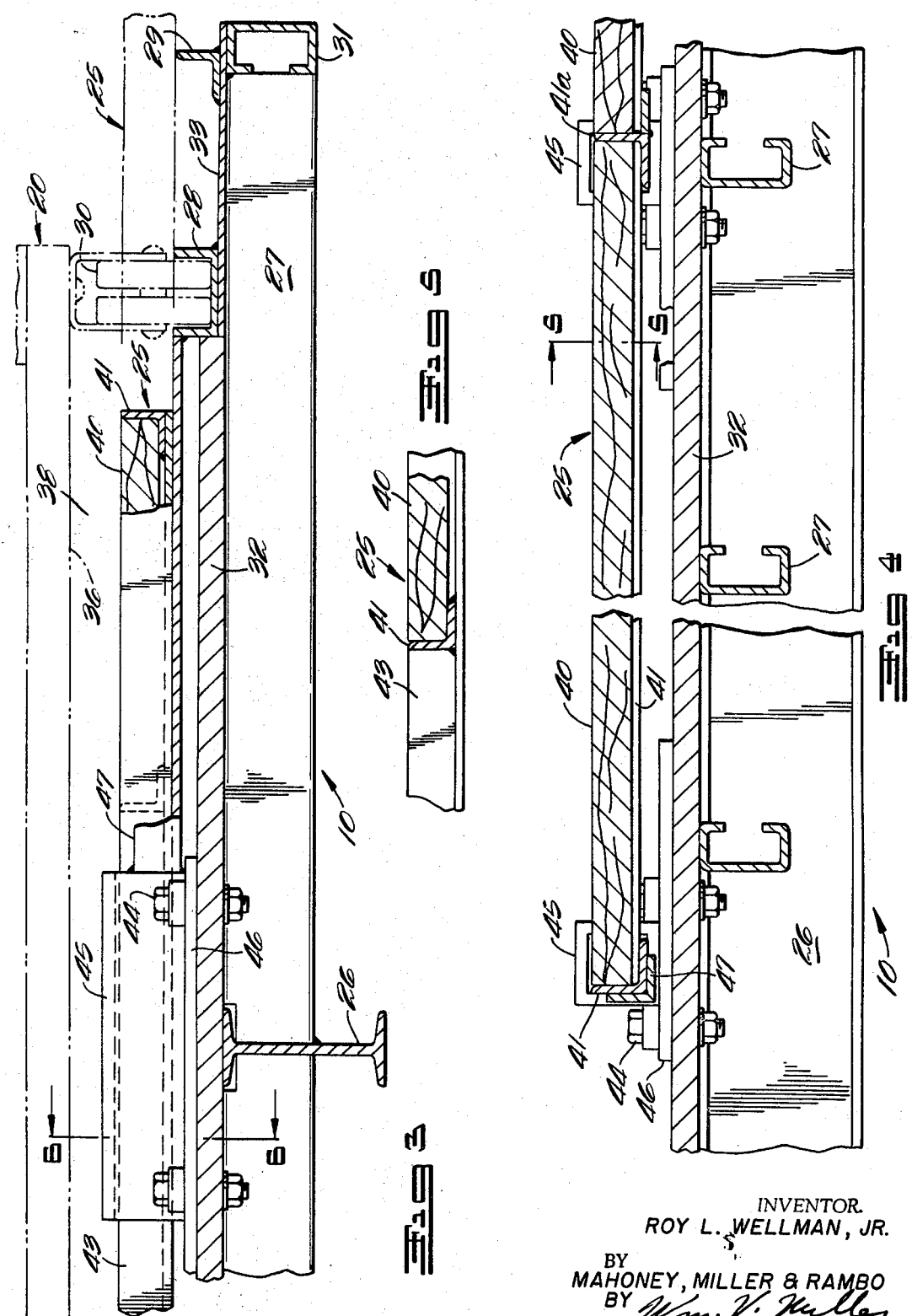

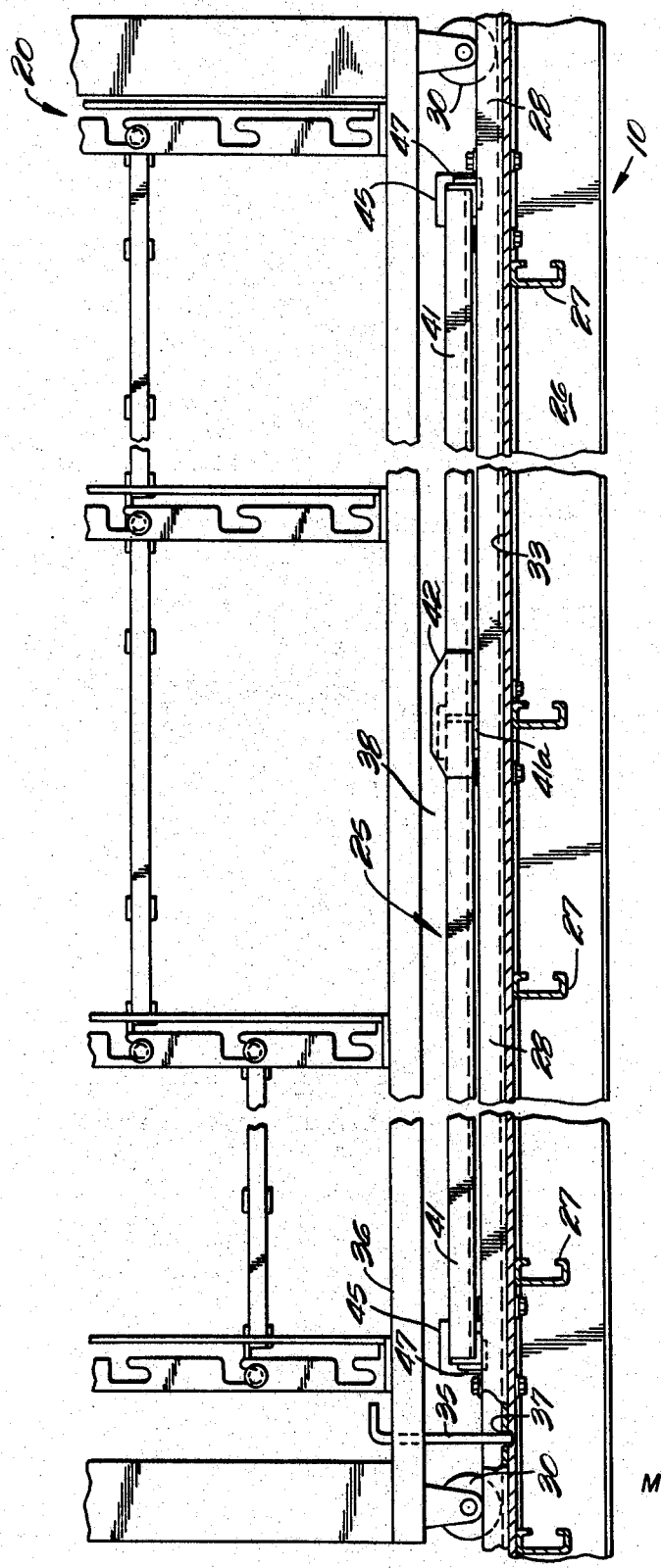

United States Patent Office 3,385,459
Patented May 28, 1968

3,385,459
CARGO TRANSPORTING APPARATUS
Roy L. Wellman, Jr., Columbus, Ohio, assignor to Federated Department Stores, Inc., The F. & R. Lazarus and Co. Division, Columbus, Ohio, a corporation of Delaware
Filed Mar. 2, 1966, Ser. No. 531,096
6 Claims. (Cl. 214—515)

ABSTRACT OF THE DISCLOSURE

A vehicle having a van type body designed and constructed for receiving a portable cargo transporting or article supporting rack of the type disclosed in my copending application Ser. No. 478,224, filed Aug. 9, 1965, now Patent No. 3,338,423 dated Aug. 29, 1967. The van is provided with access openings to provide for ready removal of articles carried by the rack and is further provided with ramps associated with said openings and adjustable from an inoperative retracted position to an extended supporting position where they will provide supports for the delivery man to stand and facilitate access to the articles through said openings.

General description and objects

The article transporting apparatus disclosed in said copending application comprises a portable transporter which is adapted to be loaded with articles and then moved into a truck or trailer, especially of the van type, for delivery of the articles. The transporter comprises a base platform which carries a novel shelf arrangement adjustable both vertically and horizontally to facilitate loading and unloading of the articles and to provide various arrangements of horizontally disposed supporting surfaces for multi-level stacking of the articles. The base platform is carried by a wheel or caster arrangement which makes it portable so that it can be readily moved into the delivery van after loading and be readily moved out of the van after the delivery of the articles which are removed from the transporter through various access openings or doors in the van.

The present invention relates particularly to a vehicle, such as a truck or trailer, having a van type body which receives and cooperates with the transporter and is provided with doors or other access openings so as to provide for ready removal of the articles carried by the transporter but which, in addition, is provided with ramps associated with the access openings adjustable from extended operative supporting positions to retracted, inoperative, nonsupporting positions, out-of-the-way between spaced parts of the van and transporter. Any of these ramps, when in extended, operative position, facilitates unloading of articles from the van, supported at a higher level by the transporter, by permitting the delivery man to stand on the ramp, and when in retracted, inoperative position, will be out of the way and will not interfere with removal of the articles, supported at a lower level by the transporter, by the delivery man standing on the pavement surface on which the vehicle is resting.

Brief description of drawings

In the accompanying drawings there is illustrated a preferred form of vehicular body for cooperating with the portable transporter movable into and out of the body.

In these drawings:

FIGURE 1 is a schematic view, in perspective, illustrating a mobile vehicular body of the van type adapted to receive the portable cargo transporter and equipped with the adjustable ramp structures in accordance with this invention.

FIGURE 2 is an enlarged, horizontal sectional view taken along line 2—2 of FIGURE 1 showing details of the ramps and adjustable mounting means.

FIGURE 3 is a transverse vertical sectional view taken along line 3—3 of FIGURE 2.

FIGURE 4 is a longitudinal vertical sectional view taken along line 4—4 of FIGURE 2.

FIGURE 5 is a transverse vertical sectional view taken along line 5—5 of FIGURE 4.

FIGURE 6 is a longitudinal vertical sectional view taken along line 6—6 of FIGURE 3.

FIGURE 7 is a longitudinal vertical sectional view taken along line 7—7 of FIGURE 2.

FIGURE 8 is a longitudinal vertical sectional view taken along line 8—8 of FIGURE 2.

Detailed description of drawings

As an example of a preferred embodiment of the present invention, there is illustrated in FIGURE 1 a mobile vehicle which may be in the form of a truck or trailer 10 of the delivery van type. This van is carried by suitable wheels, some of which are indicated at 11, for movement over pavement surfaces indicated at S. The van comprises a body 12 of a suitable closed type which has various access openings in the two sides, indicated at one side in FIGURE 1 by the numeral 13, and an access opening 14 in the rear end. The latter opening is ordinarily used for permitting wheeling movement of the portable cargo transporter or article-supporting rack 20 into the body of the van 10 when loaded and removal when the articles have been removed therefrom during delivery. Removal of the articles during delivery is usually accomplished by withdrawing them from the side access openings 13. All of the access openings may be provided with suitable closures movable between closed and opened positions and in the example shown, these closures are in the form of flexible curtain-type rolling doors 15.

The cargo transporter rack 20 may be of the construction illustrated in said copending application and the details thereof need not be described herein except insofar as to convey the manner in which the transporter 20 and the body of the van 10 cooperate with each other.

According to this invention, there is mounted on the body of the van 10 below each side access opening 13 a ramp 25. Each of these ramps is mounted by suitable slides or guiding means for movement between a retracted inoperative position where it will not project outwardly from the body to an extended operative position where it will project out from the side of the body and serve as a platform or catwalk upon which a delivery man may stand and walk longitudinally of the van body. As shown generally in FIGURE 1, the ramps 25 are located at a level corresponding substantially to that of the level of the floor of the body of the van. Consequently, with the ramp 25 extended, as shown at the rear of FIGURE 1, the delivery man can stand on it and reach through the associated access opening 13 to the higher levels of the transporter rack 20. On the other hand, with the ramp 25 retracted, as shown at the front of FIGURE 1, the delivery man can stand on the surface S and reach through the associated access opening 13 to the lower levels of the transporter rack 20 without interference from the ramp which is out of the way.

The body of the van 10 is shown as including the longitudinally extending, laterally spaced main supporting stringers or I-beams 26 which extend the full length of the body. These stringers support the horizontally disposed, transversely extending floor sills 27 at longitudinally spaced intervals and these supports project laterally outwardly beyond the beams and are preferably of C-form channels. Adjacent their outer ends, the supports or cross sills 27 carry the longitudinally extending, caster-receiving channels 28 which open upwardly and are disposed outwardly beyond and parallel to the respective beams 26. Farther outwardly on the transverse sills 27 and adjacent their outer extremities are the longitudinally extending flat plates 33 which carry ramp-supporting, angle brackets 29 adjacent their outer edges which are disposed along lines parallel to the channels 28. The upper edges of the flanges of the channels 28 and the angle brackets 29 are at the same level. The outer extremities of the transverse sills 27 are fixed to the longitudinally extending beams 31 which may be channels of C-form turned inwardly. Between the caster-receiving channels 28 is the floor web 32 which may be made of wood or other suitable material.

As indicated in said copending application, the transporter rack 20 is supported on the caster wheels 30 and these wheels are preferably arranged in pairs at the front and rear of the rack. The channels 28 on the bed or floor of the van 10 are laterally spaced the same distance as the lateral spacing of the wheels 30 so that when the rack 20 is moved into the truck body, the wheels will roll into the guide channels 28. When the rack is moved forwardly into the van body to its final position, the front and rear wheels 30 (FIGURE 8) will be disposed in predetermined longitudinal positions along the guide channels 28.

Means is provided to lock the rack 20 longitudinally in the van body 10 so that forces due to acceleration and deceleration will not move the rack to different positions longitudinally in the van body. This is important in connection with the present invention so that the wheels 30 will always be in predetermined longitudinal positions in the guide channels 28 and, therefore, will not interfere with the movable ramps 25 and associated mounting and guiding means. This locking means may take various forms but in FIGURE 8, it is illustrated as comprising an inverted L-shaped locking pin 35 which is mounted in the lower rail 36 of the rack 20 for vertical sliding movement. The lower end of the pin is adapted to be projected downwardly into an upwardly opening socket 37 (FIGURES 2 and 8) in the associated guide channel 28 when the rack 20 is in its final forward position within the van body 10. One of these locking pin arrangements may be provided adjacent each rear or forward corner or all corners of the rack for cooperating with the associated guide channel 28.

The structure of the ramps 25 and the manner in which they are mounted on the van body 10 for retraction and extension is illustrated in FIGURES 2 to 8. Each ramp 25 comprises a platform web or support surface formed by a pair of boards 40 which are disposed end-to-end within a border frame 41 composed mainly of angle iron but having an inverted T-shape support section 41a (FIGURE 4) intermediate its ends. At the outer end of this section 41a, an upstanding handgrip 42 is fixed (FIGURES 2 and 7). The ends and mid-portion of the frame 41 (FIGURE 2) are extended to provide the guide and support extensions 43 which extend slidably through the guideway members 45 which are shown of square cross-section. These guideway members 45 are fastened by lugs and bolts 44 to the floor webs 32 of the van body 10, with a spacer plate 46 disposed therebetween. It will be noted from FIGURE 2 that the guide members 45 at one side of the van floor are offset relative to the guide members at the opposite side so as to prevent interference of the guide extensions 43 of opposed ramps 25. At each end of each ramp 25, in alignment with each guide 45 and extending between that guide and the associated guide channel 28, is an angle member support 47 (FIGURES 2 to 4).

In retracted positions, the ramps 25 will be located, as illustrated in FIGURE 2 and in full lines in FIGURE 3, with their outer edges inwardly of the guide channels 28. At this time, each ramp 25 will be supported by the angle supports 47 at its ends. By grasping any of the handgrips 42 a selected ramp 25 may be pulled outwardly to extended position which is indicated by broken lines in FIGURE 3. During extension, the guides 43 will slide in the guideway members 45 and the ramps will move outwardly over the guideways 28 and the support brackets 29 and be firmly supported thereby with the guide extensions 43 still extending inwardly into the guideway members 45, as indicated by broken lines in FIGURE 2. It will be noted from FIGURES 2 and 8 that the wheels 30 are so located longitudinally of the guide channels 28, that the ramps 25 will not interfere with those wheels. Also, the rails 36 of the rack will be located a sufficient distance above the channels 28 as to provide a space 38 between the floor or the van body and the base of the rack in which the ramps 25 are ordinarily disposed. This space is of sufficient vertical extent (FIGURE 8) to provide necessary clearance below the rack rails 36 and the floor of the van body and even sufficient clearance to permit insertion of the hands in grasping the handgrips 42 during the pushing of the ramps into their retracted stored position and pulling them outwardly into their extended supporting position.

It will be apparent from the above that the previously loaded rack 20 will be moved into the van body 10 by rolling it on the wheels 30 which will enter the guide channels 28. When the rack is moved forwardly into the van body as far as possible, it will be locked longitudinally therein by means of the locking pins 35. This will locate the wheels 30 at the forward and rearward ends of the guide channels 28 (FIGURE 8) in longitudinal positions respectively forwardly and rearwardly of the longitudinally extending ramps 25 so as not to interfere with the ramps. While the van body 10 is moving, the ramps 25 will be stored in retracted position in the space 38 between the base of the rack and the floor of the van body. When the van is stopped for delivery, articles may be removed from the side access openings 13 by opening the doors 15. If the articles are in the lower levels of the rack 20, it will not be necessary to extend any of the ramps. However, if the articles are located in the upper levels of the rack 20, the proper ramp 25 may be extended to provide a support for the delivery man. In retracted positions, the ramps 25 are stored out of the way, in the space between the deck of the vehicular body 10 and the base of the rack 20, but in extended positions, they provide convenient support platforms, at a level above the pavement or road surface upon which the vehicle may travel, for a delivery man. They will not interfere with access to the lower levels of the rack when in retracted positions so that the delivery man can stand on the pavement and retrieve articles from the lower levels of the rack.

Having thus described this invention, what is claimed is:

1. In a cargo transporting apparatus, a mobile, vehicular body adapted to traverse a road surface and having a substantially horizontal deck disposed in relatively elevated relationship to the road surface and an upstanding wall structure cooperating with said deck to define an interior space and formed with at least one access opening to the interior space, a portable cargo transporter adapted to be positioned in the interior space of said vehicular body on said deck and having at least one horizontally disposed, article supporting surface carried in relatively elevated relationship to said deck surface and presented at said access opening where articles may be removed therefrom, and at least one horizontal-surface-forming ramp mounted on said vehicular body in coextensive relationship to said access opening, said ramp being selectively positionable in a retracted inoperative position in superimposed relationship with said deck permitting ready access to the lower regions of said article transporter from the road surface and in an extended operative position projecting laterally from said vehicular body providing an elevated horizontal surface on which an operator may stand for ready access to upper regions of said article transporter, said cargo transporter being in the form of a rack mounted on wheels and being movable into and out of said body through an opening in said wall structure, and means cooperating with said body and said rack for locking said rack in a predetermined position in said body relative to said access opening, said vehicular body being of the van type and the deck comprising a floor which has longitudinally extending, wheel-receiving guide channels adjacent its outer side edges but spaced inwardly from the upstanding wall structures along said edges, said rack being supported on wheels which are laterally spaced and are movable into and out of said guide channels, and means for mounting said ramps for sliding movement over said channels, said means for locking said rack in said body positioning said wheels in predetermined positions longitudinally of said channels so as not to interfere with said ramps.

2. Apparatus according to claim 1 in which the rack has a base and the wheels support the base at a position elevated above said channels, said locking means comprising interfitting means between the rack and said body.

3. Apparatus according to claim 2 in which the ramps are flat structures carried by guide members extending inwardly thereof which are slidably mounted in guides carried by said floor, said ramps being movable inwardly beyond said channels in superimposed relationship to said floor.

4. Apparatus according to claim 3 in which said ramps are in sets at opposite side edges of said floor, said floor being disposed between a pair of the guide channels which are in laterally spaced parallel relationship, said locking means comprising pins movably carried by the base and insertable in sockets along said guide channels.

5. Apparatus according to claim 4 including additional supports carried by the deck and spaced outwardly from the channel guides for cooperating therewith to support the ramps in extended positions.

6. Apparatus according to claim 5 including supports disposed inwardly from said channel guides and outwardly of the floor to support said ramps in retracted positions.

References Cited

UNITED STATES PATENTS

| | | |
|---|---|---|
| 1,371,234 | 3/1921 | Fruitticher. |
| 2,145,647 | 1/1939 | Evans _____ 280—166 |
| 2,575,615 | 11/1951 | Crump _____ 280—166 XR |
| 2,736,602 | 2/1956 | Ault _____ 296—35 |
| 3,181,714 | 5/1965 | Kappen _____ 214—516 XR |

GERALD M. FORLENZA, *Primary Examiner.*

ALBERT J. MAKAY, *Examiner.*